United States Patent
Ling et al.

(10) Patent No.: US 6,657,803 B1
(45) Date of Patent: Dec. 2, 2003

(54) METHOD AND APPARATUS FOR DATA ERROR RECOVERY USING DEFECT THRESHOLD DETECTOR AND VITERBI GAIN

(75) Inventors: Khong Mau Ling, Singapore (SG); Myint Ngwe, Singapore (SG); Kah Liang Gan, Singapore (SG); Lakshmi Anantha Challa, Singapore (SG); Quek Leong Choo, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 388 days.

(21) Appl. No.: 09/717,650

(22) Filed: Nov. 21, 2000

Related U.S. Application Data
(60) Provisional application No. 60/166,803, filed on Nov. 22, 1999.

(51) Int. Cl.[7] ................................................ G11B 5/09
(52) U.S. Cl. ........................................... 360/53; 360/46
(58) Field of Search ................................ 360/46, 51, 53

(56) References Cited

U.S. PATENT DOCUMENTS

| | | | |
|---|---|---|---|
| 3,761,905 A | 9/1973 | Hollstein, Jr. et al. | 340/174.1 H |
| 3,826,975 A | 7/1974 | Geller | 324/34 TA |
| 4,829,249 A | 5/1989 | Matsushita et al. | 324/212 |
| 4,879,703 A | 11/1989 | Kaku et al. | 369/13 |
| 4,881,136 A | 11/1989 | Shiraishi et al. | 360/25 |
| 4,912,572 A | 3/1990 | Nomura et al. | 360/46 |
| 5,150,050 A | 9/1992 | Genheimer et al. | 324/212 |
| 5,233,482 A | 8/1993 | Galbraith et al. | 360/46 |
| 5,249,169 A | 9/1993 | Ogawa | 369/44.34 |
| 5,280,395 A | 1/1994 | Matsuzaki | 360/31 |
| 5,367,409 A | 11/1994 | Ottesen et al. | 360/32 |
| 5,422,760 A | 6/1995 | Abbott et al. | 360/46 |
| 5,424,638 A | 6/1995 | Huber | 324/212 |
| 5,442,492 A | 8/1995 | Cunningham et al. | 360/46 |
| 5,497,111 A | 3/1996 | Cunningham | 327/58 |
| 5,546,245 A | 8/1996 | Sato | 360/65 |
| 5,625,506 A | 4/1997 | Dovek et al. | 360/51 |
| 5,680,383 A | 10/1997 | Clark et al. | 369/59 |
| 5,701,314 A | 12/1997 | Armstrong et al. | 371/40.3 |
| 5,818,656 A | 10/1998 | Klaassen et al. | 360/67 |
| 5,831,781 A | 11/1998 | Okamura | 360/31 |
| 5,917,670 A | 6/1999 | Scaramuzzo et al. | 360/53 |
| 5,917,794 A | * 6/1999 | Honma | 369/59 |
| 5,920,578 A | 7/1999 | Zook | 371/37.4 |
| 6,005,726 A | 12/1999 | Tsunoda | 360/46 |
| 6,038,091 A | 3/2000 | Reed et al. | 360/46 |
| 6,055,118 A | 4/2000 | Du | 360/46 |

FOREIGN PATENT DOCUMENTS

| | | |
|---|---|---|
| EP | 0 269 756 A1 | 6/1988 |
| EP | 0 831 480 A1 | 3/1998 |

\* cited by examiner

*Primary Examiner*—Regina N. Holder
(74) *Attorney, Agent, or Firm*—Theodore M. Magee; Westman, Champlin & Kelly, P.A.

(57) ABSTRACT

A method and apparatus are provided for reading from a storage medium to form data values. A signal is generated from a sector on the storage medium and a section of that signal is identified as having a change in amplitude. A gain multiplier is activated to multiply that section of the signal by a gain value. The gain multiplier is deactivated at the end of the section so that the remaining portion of the sector signal is not multiplied by the gain value. This results in a defect adjusted signal that is applied to a detector to detect data values.

16 Claims, 6 Drawing Sheets

METHOD AND APPARATUS FOR DATA ERROR RECOVERY USING DEFECT THRESHOLD DETECTOR AND VITERBI GAIN

CROSS-REFERENCE TO RELATED APPLICATION

This application claims priority from a U.S. Provisional Application having Ser. No. 60/166,803, filed on Nov. 22, 1999, and entitled Data Error Recovery Using Defect Threshold Detector and Viterbi Gain and is a continuation of PCT Application Ser. No. PCT/US00/31993, entitled METHOD AND APPARATUS FOR DATA ERROR RECOVERY USING DEFECT THRESHOLD DETECTOR AND VITERBI GAIN, having and filed on even date herewith, which designates the United States.

FIELD OF THE INVENTION

The present invention relates to read channels in storage devices. In particular, the present invention relates to defect detection in read channels.

BACKGROUND OF THE INVENTION

In data storage devices, data that has been written to a storage medium is read from the medium through a read channel. Ideally, the average amplitude of the read signal remains within an expected range over the entire medium. However, due to defects on the medium, and errors that occurred while the data was being written to the medium, small sections of data read from the medium can have amplitudes that are significantly larger or significantly smaller than the amplitude of the data read from other portions of the medium.

Significant changes in the amplitude of the read signal can create errors in the data decoded from the read signal. Although some of these errors can be corrected by an error correction code module in the read channel, other errors are so large that the error correction code cannot correct them. When the error correction code detects an error but cannot correct it, the storage device typically tries to reread the data.

In storage systems that use a partial response maximum likelihood (PRML) read channel, parameters of the read channel are changed during the retries. In particular, a gain applied in the read channel is modified during the retries in an attempt to reduce the number of errors in the read data. Under the prior art, errors in the data are identified as occurring within a particular sector on the medium by the error correction code. However, the error correction code cannot pinpoint the location of the error within the sector. Because of this, the gain adjustments made to the read channel must be done on a sector wide basis. Such sector wide gain adjustment has not provided as much reduction in data errors as would be desired.

SUMMARY OF THE INVENTION

A method and apparatus are provided for reading from a storage medium to form data values. A signal is generated from a sector on the storage medium and a section of that signal is identified as having a change in amplitude. A gain multiplier is activated to multiply that section of the signal by a gain value. The gain multiplier is deactivated at the end of the section so that the remaining portion of the sector signal is not multiplied by the gain value. This results in a defect adjusted signal that is applied to a detector to detect data values.

DETAILED DESCRIPTION OF ILLUSTRATIVE EMBODIMENTS

Figure 1:
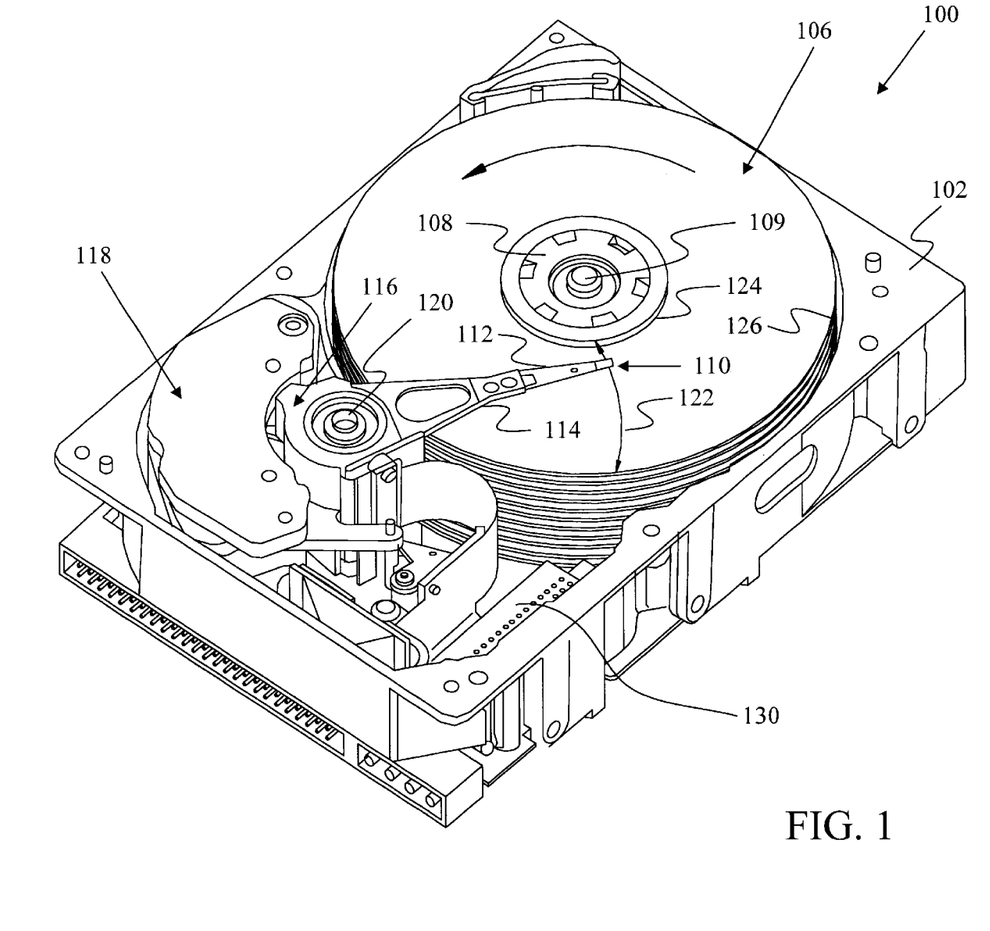
FIG. 1 is a perspective view of disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
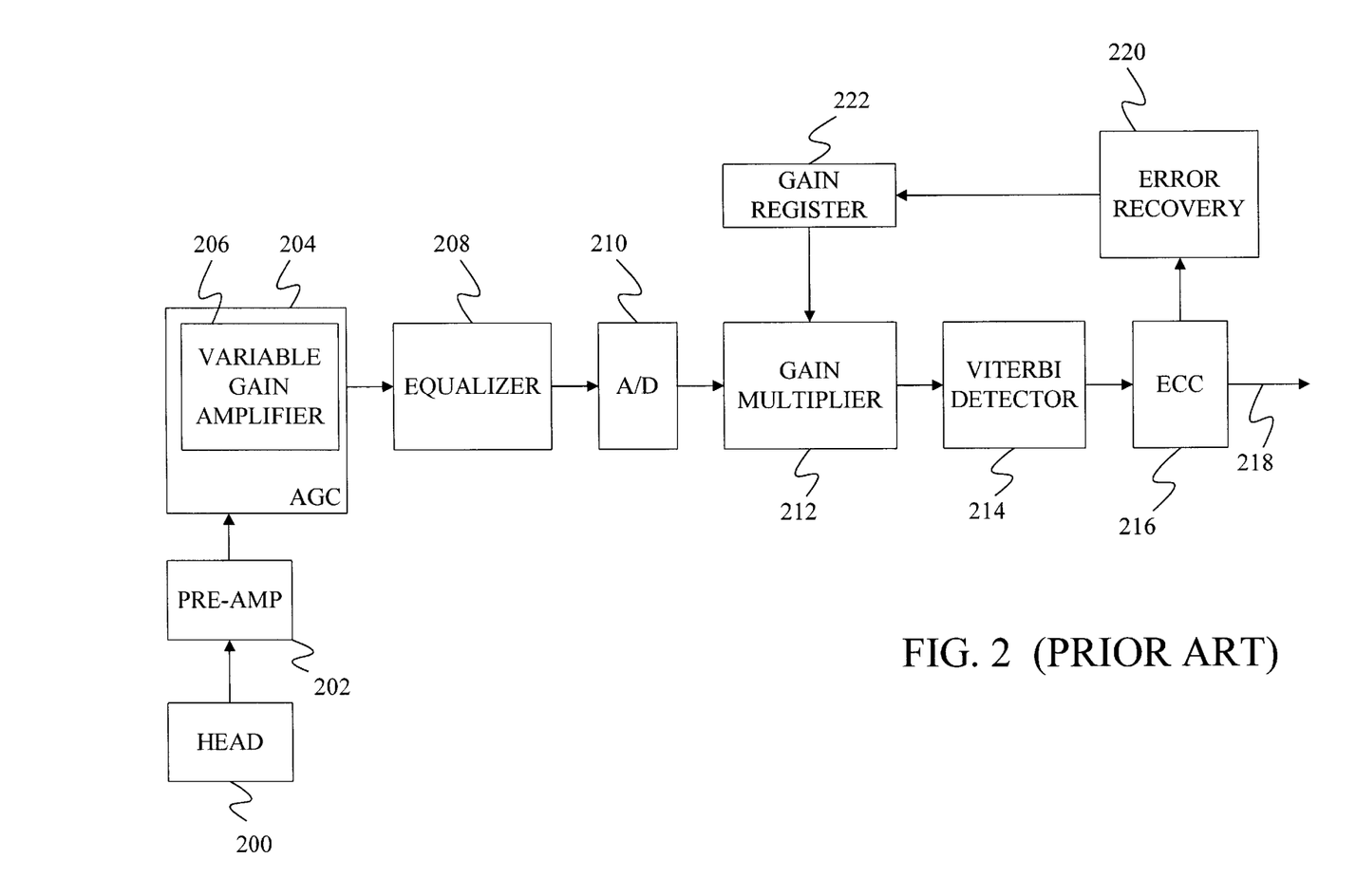
FIG. 2 is a block diagram of a read channel of the prior art.

FIG. 2 is a block diagram of components of the prior art used in reading information from a medium. In FIG. 2, a read head 200 generates an electrical read signal by transducing a magnetic field or optical response from the medium. The electrical signal generated by read head 200 is provided to a preamplifier 202, which amplifies the signal. The amplified signal is applied to a read channel, which begins with an automatic gain control 204 that uses an internal feedback loop (not shown) to adjust a variable gain amplifier 206. Typically, the automatic gain control 204 has a relatively slow response time so that it ignores changes in the amplitude of the read signal that occur over only small periods of time.

The amplified signal from variable gain amplifier 206 is provided to an equalizer 208, which performs one or more equalization operations on the read signal. The equalization functions performed by equalizer 208 shape the read signal so that it better matches an expected channel response signal. For example, equalizer 208 can shape the response to match a channel response known as EPR4 or a channel response known as $E^2PR4$.

The equalized read signal provided by equalizer 208 is sampled and converted into a digital signal by an analog-to-digital converter 210. The sample values are passed through a digital gain multiplier 212 (discussed further below) before being provided to a Viterbi detector 214, which forms the last part of the read channel.

Viterbi detector 214 uses the digital samples to identify a most likely sequence of data values represented by those samples. This most likely sequence of data values is provided to an error correction code module 216, which performs error correction code detection and correction. If error correction code module 216 does not detect any errors or if it is able to correct all the errors it detects, it outputs a sequence of data values 218.

If, however, error correction code module 216 detects an error it cannot correct, it indicates that the current sector is in error by passing an error value to an error recovery module 220. In the prior art, error correction code module 216 is unable to identify the particular location within a sector that is in error. Instead, error correction code module 216 simply indicates that the entire sector has an error.

Upon receiving an indication that a sector contains an error, error recovery module 220 suspends reading of the data and initiates a reread of the sector in error. Under some systems of the prior art, before retrying the read, error recovery module 220 adjusts a gain value in a gain register 222 that is used by gain multiplier 212. By adjusting this gain value, error recovery module 220 can increase or decrease the gain applied to the digital samples provided by analog-to-digital converter 210. If the reread is not successful, error recovery module 220 will again change the gain value in gain register 222 and attempt the read once more.

Note that under the prior art, the gain placed in gain register 222 during a retry of the read operation is simply a guess on the part of the recovery module 220, because it has no idea whether the error detected by error correction code module 216 was caused by an excessively large amplitude in the read signal or an excessively low amplitude it the read signal. Also note that because error correction code module 216 does not identify where the error occurred in the sector, the gain must be applied across the entire sector.

Figure 3:
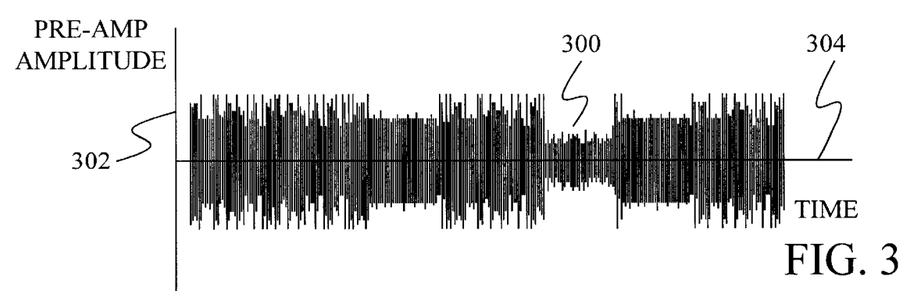
FIG. 3 is a graph of a read signal output by a preamplifier.

FIG. 3 shows a graph of a read signal from preamplifier 202 that includes a defect area 300. In FIG. 3, the amplitude of the preamplifier output signal is shown along vertical axis 302 and time is shown along horizontal axis 304. The read signal of FIG. 3 is generated from a data pattern representing a string of all zeros. In defect 300, the amplitude of the preamplifier output signal is lower than the amplitude in the is surrounding parts of the signal.

Figure 4:
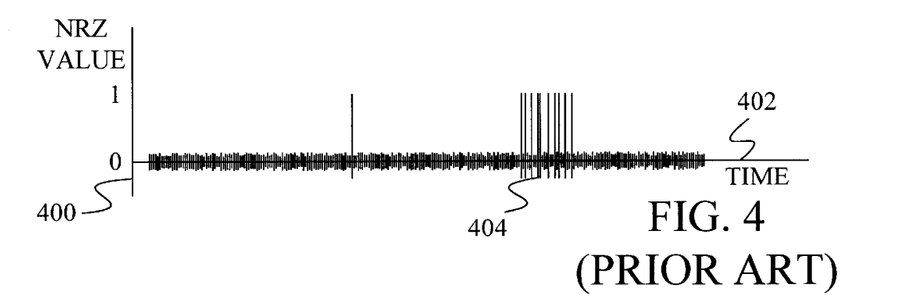
FIG. 4 is a graph of NRZ data when no gain adjustment is applied to the read signal of FIG. 3.

FIG. 4 shows the output of Viterbi detector 214 when the read channel of FIG. 2 receives the read signal of FIG. 3. In FIG. 4, the non-return to zero (NRZ) values are shown along vertical axis 400 and time is shown along horizontal axis 402. The NRZ values in FIG. 4 have been aligned horizontally with the portions of the read signal in FIG. 3 from which they are derived. The NRZ values of FIG. 4 are derived without applying a gain to the digital values provided by analog-to-digital converter 210.

In FIG. 4, the NRZ values ideally should all be zero since the data being read from the disc represents a string of all zeros. Thus, an NRZ "non-zero" in FIG. 4 represents an error.

As can be seen from FIG. 4, the output of the Viterbi detector includes a large group of errors 404 that are attributed to the low amplitude in defect area 300 of FIG. 3. Thus, without some gain adjustment, the Viterbi detector generates a significant number of errors when the amplitude of the read signal varies from its expected amplitude.

Figure 5:
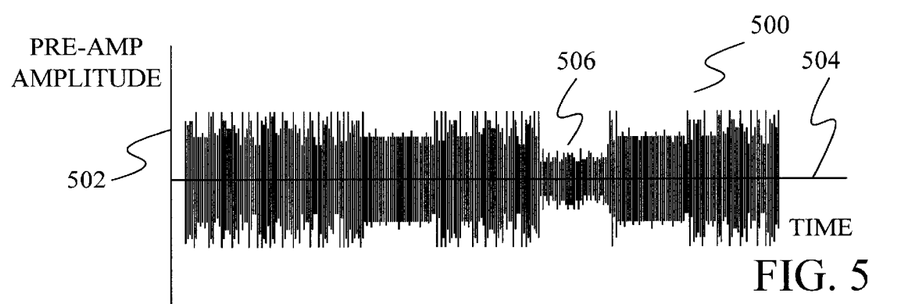
FIG. 5 is a graph of a read signal with defect provided by a preamplifier.

FIG. 5 provides a graph of a second read signal 500 with the amplitude of the read signal shown on vertical axis 502 and time shown along horizontal axis 504. Read signal 500 includes a defect section 506. As with the read signal of FIG. 3, the read signal of FIG. 5 is generated from a media pattern that represents a sequence of all zeros in the data.

Figure 6:
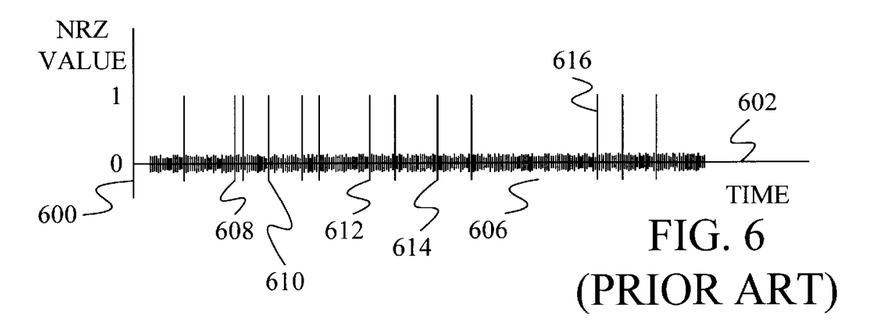
FIG. 6 is a graph of NRZ data produced from the read signal of FIG. 5 after it has had a sector wide gain adjustment of the prior art.

FIG. 6 is a graph of the output of the Viterbi detector as a function of time based on the read signal in FIG. 5. In FIG. 6, the NRZ value of the data is shown along vertical axis 600 and time is shown along horizontal axis 602. The NRZ data shown in FIG. 6 is generated by Viterbi detector 214 after gain multiplier 212 has applied a gain to an entire sector in order to recover from an error detected by error correction code module 216.

As can be seen from FIG. 6, the gain adjustment has removed the errors that would have been associated with defect 506 of FIG. 5. This can be seen in section 606 of FIG. 6, where there are no NRZ values of one. However, adjusting the gain has caused a number of additional errors to be added to the NRZ sequence. In particular, errors 608, 610, 612, 614, and 616, for example, have been added by the gain adjustment. Thus, although adjusting the gain under the prior art reduces the errors associated with the defect area, it introduces other errors associated with parts of the read signal that earlier had not contained errors.

Thus, the present inventors have discovered that the sector-wide gain adjustment used by the prior art is less than ideal and that a better system for adjusting the read signal for defects would be beneficial.

Figure 7:
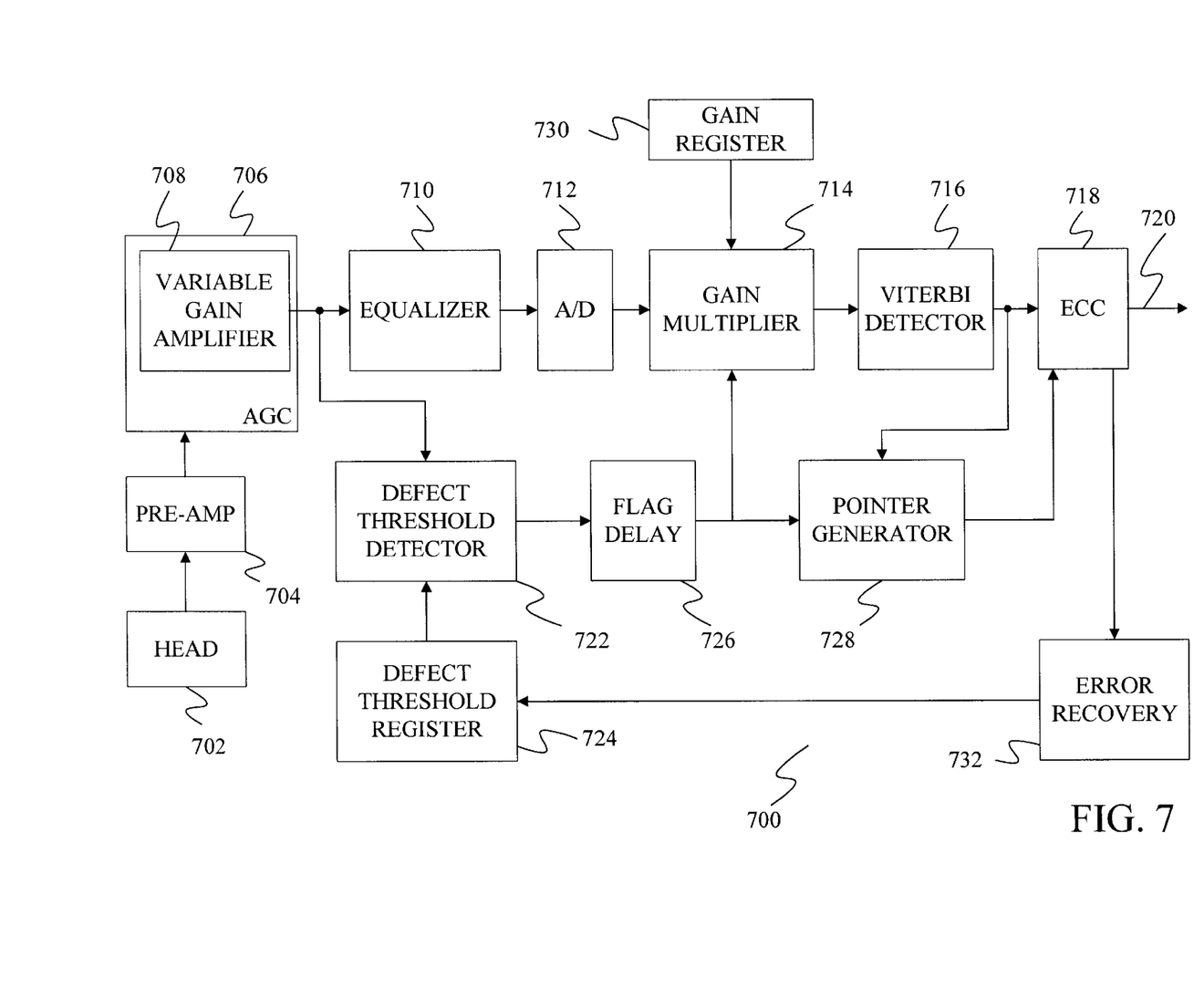
FIG. 7 is a block diagram of a read channel of the present invention.

FIG. 7 provides a block diagram of reading and recovery components 700 of one embodiment of the present invention. In components 700, a read head 702 generates a read signal that is provided to a preamplifier 704. The preamplifier amplifies the read signal and provides an amplified signal to a read channel that begins with an automatic gain control 706. The automatic gain control includes a variable gain amplifier 708 that amplifies the read signal.

The amplified analog signal from variable gain amplifier 708 is provided to an equalizer 710, which operates in a manner similar to equalizer 208 of FIG. 2. The equalized signal is provided to an analog-to-digital converter 712, which samples the analog signal and converts the samples into digital values. The output of analog-to-digital converter 712 is a sequence of digital values that are provided to a gain multiplier 714.

Gain multiplier 714 multiplies the digital sample by a digital value to produce a sequence of gain adjusted digital values. The sequence of gain adjusted digital values are provided to a Viterbi detector 716, which decodes the gain adjusted values to identify a sequence of decoded data that forms the output of the read channel.

The sequence of decoded data is provided to an error correction code module 718, which detects and, if possible, corrects errors in the sequence of data. If error correction code module 718 does not detect any errors, or is able to correct all of the errors that it finds, it outputs a sequence of read data 720.

The output of variable gain amplifier 708 is also provided to a defect threshold detector 722. Defect threshold detector 722 tracks the amplitude of the analog signal and compares the amplitude to one or more thresholds found in a defect threshold register 724. In one embodiment, defect threshold register 724 includes a low threshold and a high threshold.

If the maximum amplitude of the read signal drops below the low threshold, or rises above the high threshold for longer than a pre-selected time, defect threshold detector 722 generates an error flag. In one embodiment, defect threshold detector 722 maintains the error flag until the maximum amplitude is restored below the high threshold and above the low threshold.

The error flag generated by defect threshold detector 722 is provided to a flag delay 726. Flag delay 726 delays the flag for a period of time equal to the time it takes for the defective portion of the read signal to pass through equalizer 710 and analog-to-digital converter 712. In this manner, the flag generated by flag delay 726 is provided to gain multiplier 714 at the same time that the digital samples for the defective portion of the read signal enter gain multiplier 714.

When gain multiplier 714 receives a flag from defect threshold detector 722 indicating that there is a defect in the read signal, the gain multiplier accesses a gain value from gain register 730 and begins multiplying the digital samples from analog-to-digital converter 712 by the gain value. Gain multiplier 714 continues to multiply the digital samples by the gain value until the flag value changes state indicating the end of the defect in the read signal.

Note that gain multiplier 714 is not active during the entire sector, but is only active during the defective portion of the read signal. As such, the gain is only applied to the defective portions of the signal thereby preventing the introduction of additional errors that are associated with applying a gain to portions of the read signal that are not defective.

In one embodiment of the invention, defect threshold register 724 includes a plurality of different thresholds that are each associated with a different flag. For example, defect threshold register 724 can include thresholds of positive 10%, positive 20%, positive 30%, negative 10%, negative 20%, and negative 30%. Each of these thresholds can have a different flag associated with it such that when gain multiplier 714 receives a flag that is specific to a specific threshold, it can retrieve a gain that is specifically set for that threshold. For example, if gain multiplier 714 receives a flag associated with a positive 20% increase in the amplitude, it can select a gain in gain register 730 that provides a gain of 1 over 20%. Thus, the gain selected by gain multiplier 714 can be specifically chosen based on the size of the defect detected by defect threshold detector 722.

Under one embodiment of the invention, the flag generated by defect threshold detector 722 is also provided to error correction code module 718 as an eraser pointer that points to a sub-string of data in the sequence of data provided by Viterbi detector 716. In the embodiment of FIG. 7, this eraser pointer is generated by pointer generator 728 which receives the flag from flag delay 726 and the location of the data generated by Viterbi detector 716. Using the eraser pointer, error correction code module 718 can limit its error correction code algorithm to the blocks of data pointed to by the eraser pointer. By focusing on this limited set of data, error correction code module 718 is able to perform its error correction functions more efficiently.

Under some embodiments, if error correction code module 718 is still unable to recover the data, it will indicate this to error recovery 732, which will retry the read operation. Before retrying the read operation, error recovery 732 can change the defect thresholds set in threshold register 724 so that they are more sensitive. Thus, defects that form smaller changes in amplitude will then be detected by defect threshold detector 722.

Although defect detector 722 is shown positioned at the output of variable gain amplifier 708 in FIG. 7, in other embodiments the defect detector is positioned at the output of equalizer 710. In still other embodiments, defect threshold detector 722 is positioned at the output of analog-to-digital converter 712. Those skilled in the art will recognize that the operation of defect threshold detector 722 is basically the same in all of these positions although the defect threshold detector must be changed slightly to accept the different types of input values it receives at these different positions. For example, defect threshold detector 722 must be changed slightly to accept the equalized signal produced by equalizer 710 if it is positioned after equalizer 710 instead of variable gain amplifier 708. Similarly, if defect threshold detector 722 is positioned after analog-to-digital converter 712, it must be changed slightly to accept digital values rather than analog values.

Figure 8:
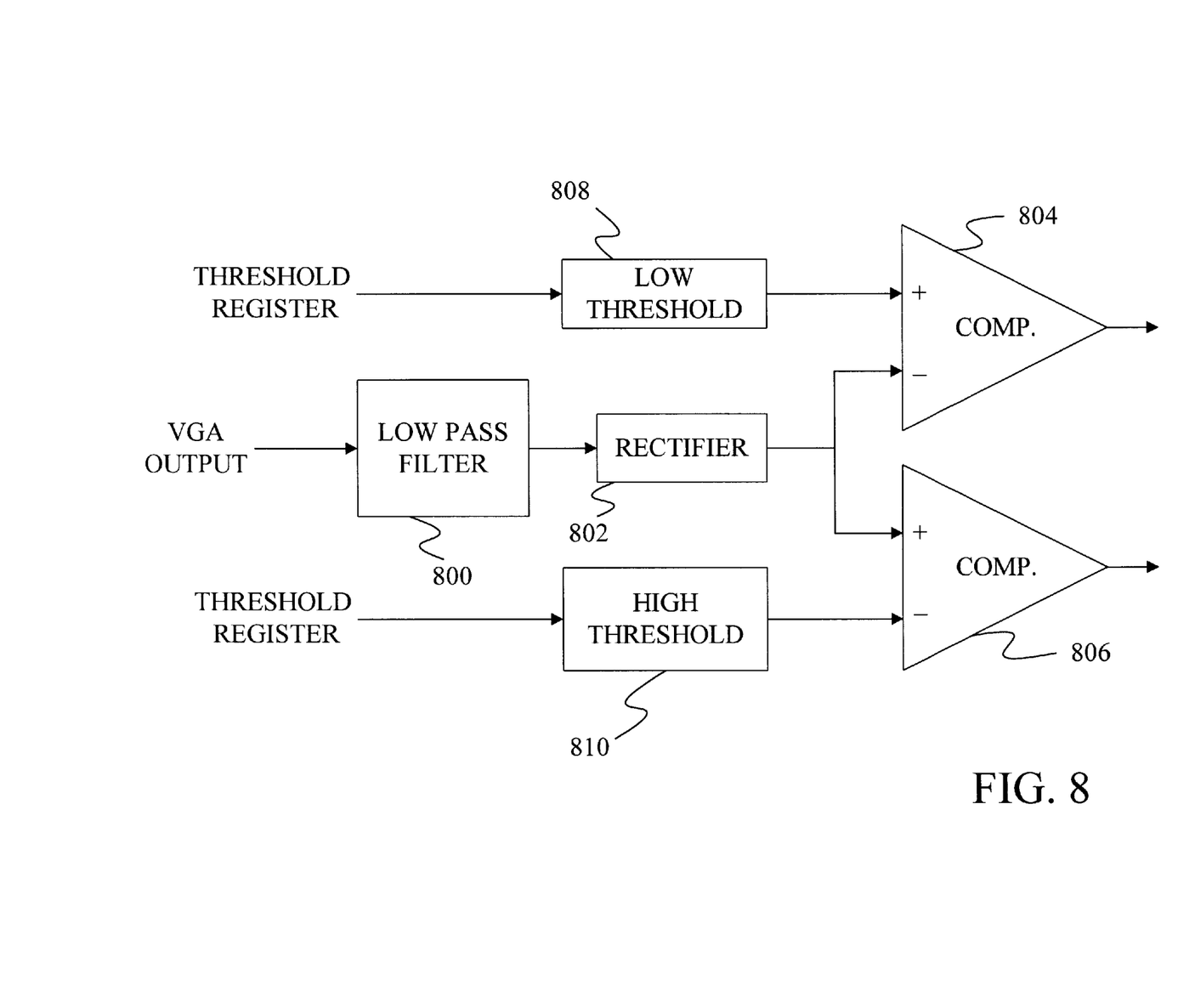
FIG. 8 is a block diagram of a defect threshold detector of one embodiment of the present invention.

FIG. 8 provides a block diagram of one embodiment of a defect detector under the present invention. The defect detector of FIG. 8 is connected to the output of variable gain amplifier 708 of FIG. 7 and thus operates on analog signals.

In FIG. 8, the output of variable gain amplifier 708 is provided to a low pass filter 800. The time constant of low pass filter 800 is set so that it does not react to short duration changes in the output of variable gain amplifier 708 but does react fast enough to quickly detect actual defects. This prevents the defect detector from being falsely triggered while at the same time limiting the number of error bytes that go undetected.

The filtered output from low pass filter 800 is provided to a rectifier 802, which provides the absolute magnitude of the filtered signal. This absolute magnitude signal is then provided to two comparators 804 and 806.

Comparator 804 receives the absolute magnitude signal on its inverting input and a d.c. low threshold signal on its non-inverting input. The low threshold signal is generate by a low threshold generator 808 based on a low threshold value stored in defect threshold register 724 of FIG. 7. Based on these inputs, comparator 804 generates a low output signal as long as the absolute magnitude signal from rectifier 802 is above the low threshold. When the signal from rectifier 802 drops below the low threshold, the output of comparator 804 goes high.

Comparator 806 receives the absolute magnitude signal on its non-inverting input and a d.c. high threshold signal on its inverting input. The high threshold signal is generate by a high threshold generator 810 based on a high threshold value stored in defect threshold register 724 of FIG. 7. Based on these inputs, comparator 804 generates a low output signal as long as the absolute magnitude signal from rectifier 802 is below the high threshold. When the signal from rectifier 802 rises above the high threshold, the output of comparator 804 goes high.

The outputs of comparators 804 and 806 may be provided directly to gain multiplier 714 and error correction code 718 as two separate flags or may be combined into a single flag by a flag generation module (not shown).

Figure 9:
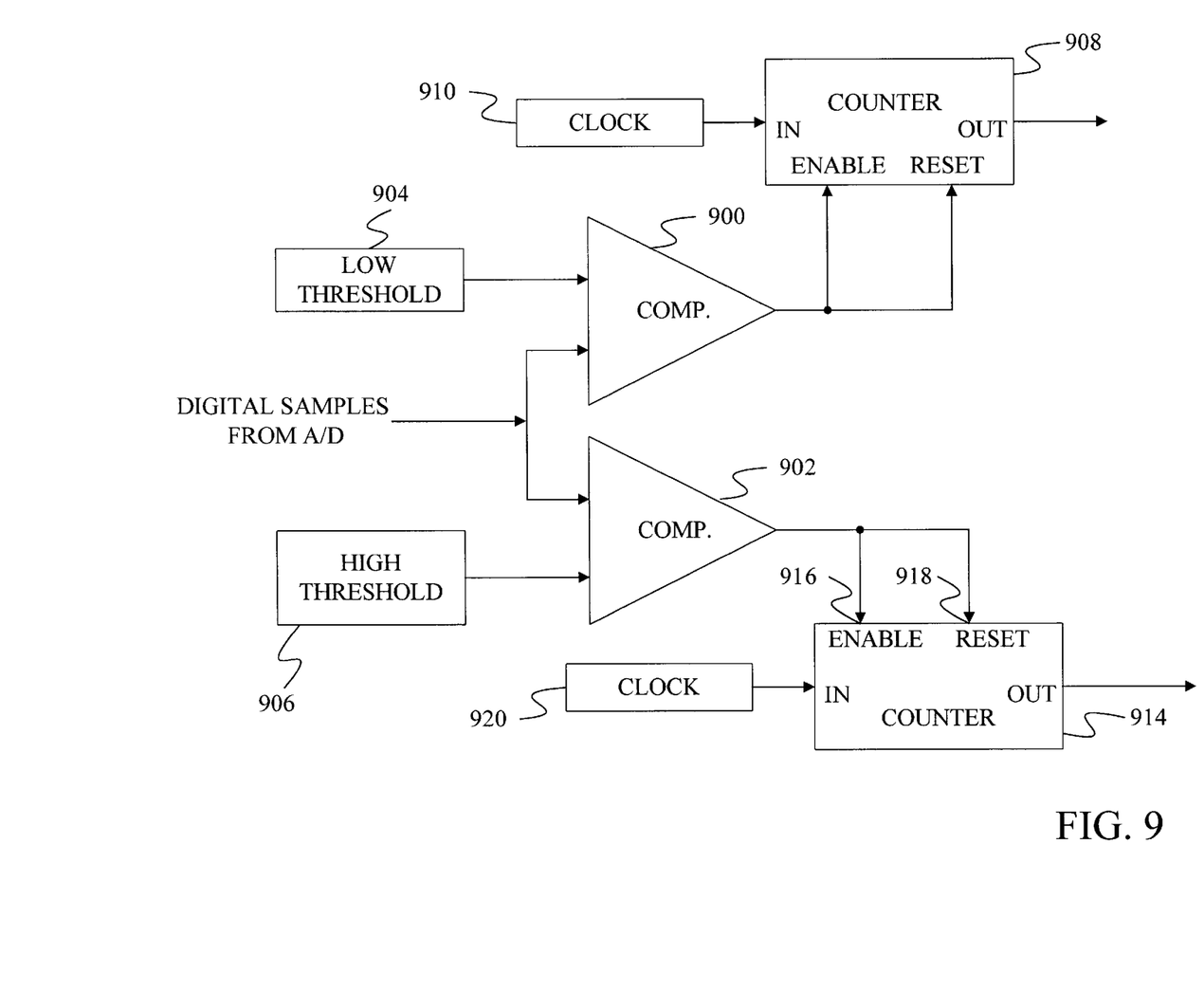
FIG. 9 is a block diagram of a defect threshold detector of a second embodiment of the present invention.

FIG. 9 provides an alternative embodiment of a defect detector of the present invention. The defect detector of FIG. 9 is configured to receive input from analog-to-digital convertor 712 of FIG. 7 instead of from variable gain amplifier 708. In particular, the defect detector of FIG. 9 is designed to receive samples taken from the peaks of the signal provided to the analog-to-digital convertor.

In FIG. 9, digital samples from analog-to-digital convertor 712 are provided to two digital comparators 900 and 902.

Digital comparator 900 also receives a digital value from low threshold register 904 that represents the low threshold for defect detection. Digital comparator 902 receives a high threshold value from high threshold register 906.

The output of comparator 900 is attached to the enable input and reset input of a counter 908. Counter 908 also receives a clock signal from a clock 910. When the digital samples drop below the low threshold, comparator 900 generates a high output signal. The transition from low to high causes counter 908 to reset. While the output of comparator 900 remains high, counter 908 increments its count once for every positive-going transition in the clock signal generated by clock 910. When the count in counter 908 reaches a pre-determined value, the output of counter 908 transitions from low to high indicating the location of a defect. Thus, the digital samples from analog-to-digital converter 712 must remain below the low threshold for a period of time before the counter will indicate that there is a defect.

The output of comparator 902 is attached to the enable input and reset input of a counter 914. Counter 914 also receives a clock signal from a clock 920. When the digital samples rise above the high threshold, comparator 902 generates a high output signal. The transition from low to high causes counter 914 to reset. While the output of comparator 902 remains high, counter 914 increments its count once for every positive-going transition in the clock signal generated by clock 920. When the count in counter 914 reaches a pre-determined value, the output of counter 914 transitions from low to high indicating the location of a defect. Thus, the digital samples from analog-to-digital converter 712 must remain above the threshold for a period of time before counter 914 will indicate that there is a defect.

Although two embodiments of the defect detector have been described above, the present invention is not limited to these embodiments. In particular, defect detectors used in the present invention may have other designs and may be located at other places within the read channel.

In summary, the present invention provides a method of reading from a storage medium 106 to form data values 720. The method includes generating a signal 500 from a sector of the storage medium 106 and identifying a section 506 of the signal that has a change in amplitude. A gain multiplier 714 is then activated to multiply the section of the signal by a gain value during the section of the signal that has a change in amplitude. The gain multiplier 714 is deactivated at the end of the section of the signal that has the change in amplitude. Data is then detected from the resulting defect adjusted signal.

The present invention also provides reading and recovery components 700 in a disc drive for converting patterns on a medium 106 into read data 720. The reading and recovery components 700 include a read head 702 that generates a read signal from a sector of patterns on the medium 106. A defect threshold detector 722 receives a first form of the read signal and identifies at least one section of the read signal as a defect section having abnormal amplitudes. A gain multiplier 714 receives a second form of the read signal and forms a defect adjusted read signal by multiplying sections of the second form of the read signal that correspond to the defect sections by a gain value without multiplying the remainder of the second form of the read signal by the gain value. A detector 716 then converts the defect adjusted read signal into data values.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the read channel while maintaining substantially the same functionality without departing from the scope and spirit of the present invention. In addition, although the preferred embodiment described herein is directed to a read channel for a disc drive system, it will be appreciated by those skilled in the art that the teachings of the present invention can be applied to other systems, like communication systems or other storage systems, without departing from the scope and spirit of the present invention.

What is claimed is:

1. A method of reading from a storage medium to form data values, the method comprising steps of:
   (a) generating a signal from a sector of the storage medium;
   (b) identifying a section of the signal that has a change in amplitude;
   (c) activating a gain multiplier to multiply the section of the signal by a gain value during the section of the signal that has a change in amplitude and deactivating the gain multiplier at the end of the section, to produce a defect adjusted signal; and
   (d) detecting data values in the defect adjusted signal.

2. The method of claim 1 wherein identifying step (b) comprises comparing the amplitude of the signal to a threshold value.

3. The method of claim 2 wherein comparing the amplitude of the signal to a threshold value comprises comparing the amplitude to an upper threshold value.

4. The method of claim 2 wherein comparing the amplitude of the signal to a threshold value comprises comparing the amplitude to a lower threshold value.

5. The method of claim 2 wherein comparing the amplitude of the signal to a threshold value comprises comparing the amplitude to a plurality of threshold values and wherein activating step (c) comprises selecting a gain value from a plurality of gain values based on a particular threshold value.

6. The method of claim 1 further comprising steps of:
   (e) generating an erasure pointer that indicates the location of data values associated with the section of the signal; and
   (f) limiting the number of data values used in error correction based on the erasure pointer.

7. The method of claim 1 wherein activating step (c) comprises multiplying digital samples of the signal by the gain value.

8. In a disc drive, reading and recovery components for converting patterns on a medium into read data, the reading and recovery components comprising:
   a read head that generates a read signal from a sector of patterns on the medium;
   a defect threshold detector that receives a first form of the read signal and identifies at least one section of the read signal as a defect section having abnormal amplitudes;
   a gain multiplier that receives a second form of the read signal and that forms a defect adjusted read signal by multiplying sections of the second form of the read signal that corresponds to the defect sections by a gain value without multiplying the remainder of the second form of the read signal by the gain value; and a detector that converts the defect adjusted read signal into data values.

9. The reading and recovery components of claim 8 wherein the first from of the read signal is the same as the second form of the read signal.

10. The reading and recovery components of claim 8 further comprising a threshold register that provides a threshold amplitude to the defect threshold detector wherein the defect threshold detector compares the threshold amplitude to the amplitude of the first form of the read signal to identify the defect sections.

11. The reading and recovery components of claim 10 further comprising an error recovery module that can change a threshold amplitude in the threshold register before a retry of a read operation.

12. The reading and recovery components of claim 10 further comprising a gain register that is accessed by the gain multiplier to retrieve a gain value.

13. The reading and recovery components of claim 12 wherein the threshold register contains a plurality of threshold amplitudes and the gain register contains a separate gain value for each threshold amplitude in the threshold register.

14. The reading and recovery components of claim 8 wherein the second from of the read signal comprises digital samples of the read signal.

15. The reading and recovery components of claim 8 further comprising:

a pointer generator that generates an erasure pointer, the erasure pointer indicating the location of data values associated with a defect section; and an error correction code module that receives the erasure pointer and the data values from the detector and that limits the application of error correction code activities to only some of the data values generated by the detector based on the erasure pointer.

16. A disc drive for reading data from tracks along a disc, the disc drive comprising:

an actuator assembly with a read head that is able to position the read head relative to a track; and reading means coupled to the head of the actuator assembly for converting a read signal generated by the head into data values.

* * * * *

UNITED STATES PATENT AND TRADEMARK OFFICE
CERTIFICATE OF CORRECTION

PATENT NO. : 6,657,803 B1  Page 1 of 1
DATED : December 2, 2003
INVENTOR(S) : Khong Mau Ling et al.

It is certified that error appears in the above-identified patent and that said Letters Patent is hereby corrected as shown below:

Column 9,
Line 6, change "wherein the first from" to -- wherein the first form --

Column 10,
Line 2, change "wherein the second from" to -- wherein the second form --

Signed and Sealed this

Twenty-third Day of March, 2004

JON W. DUDAS
*Acting Director of the United States Patent and Trademark Office*